No. 777,398. Patented December 13, 1904.

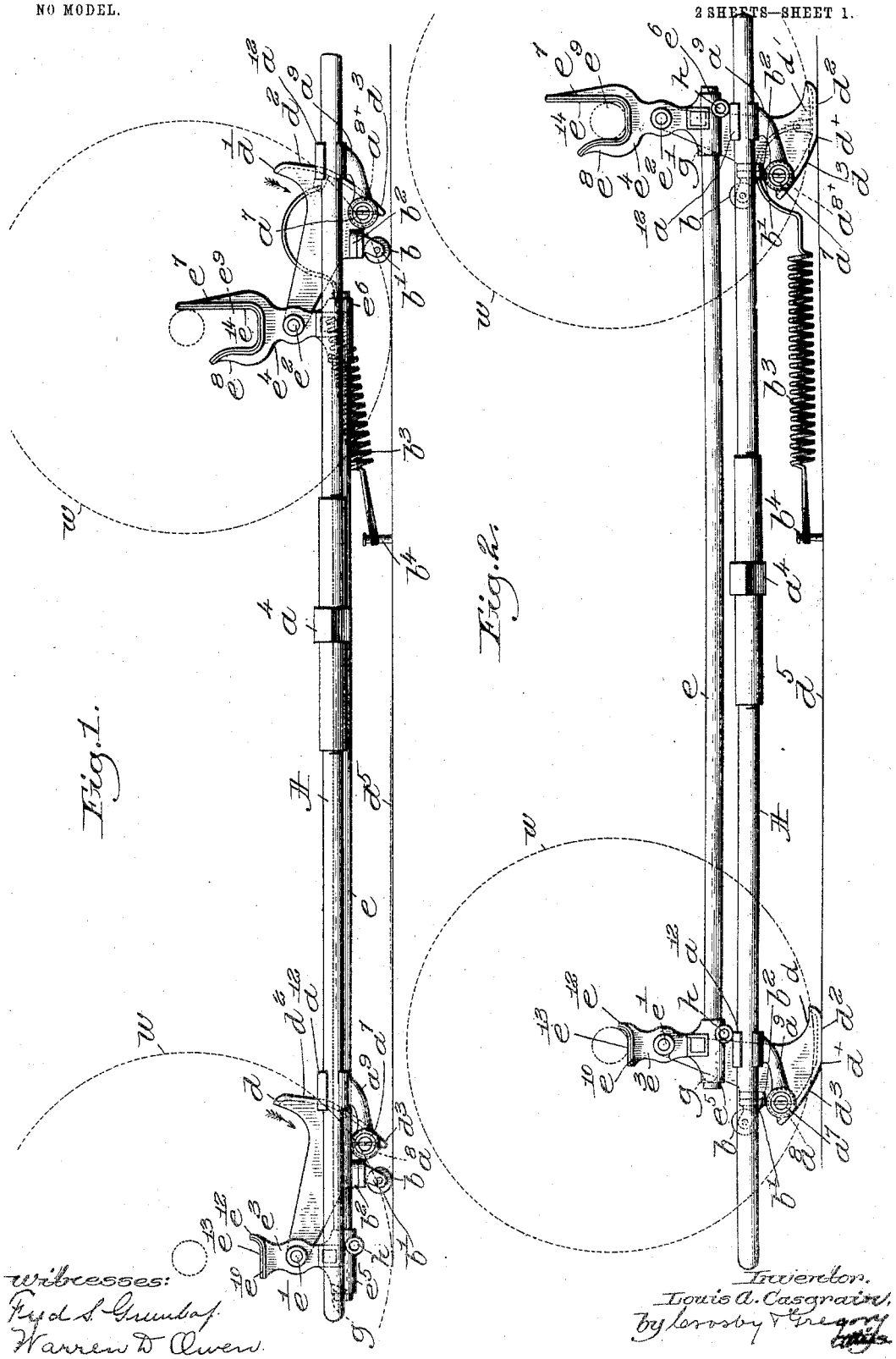

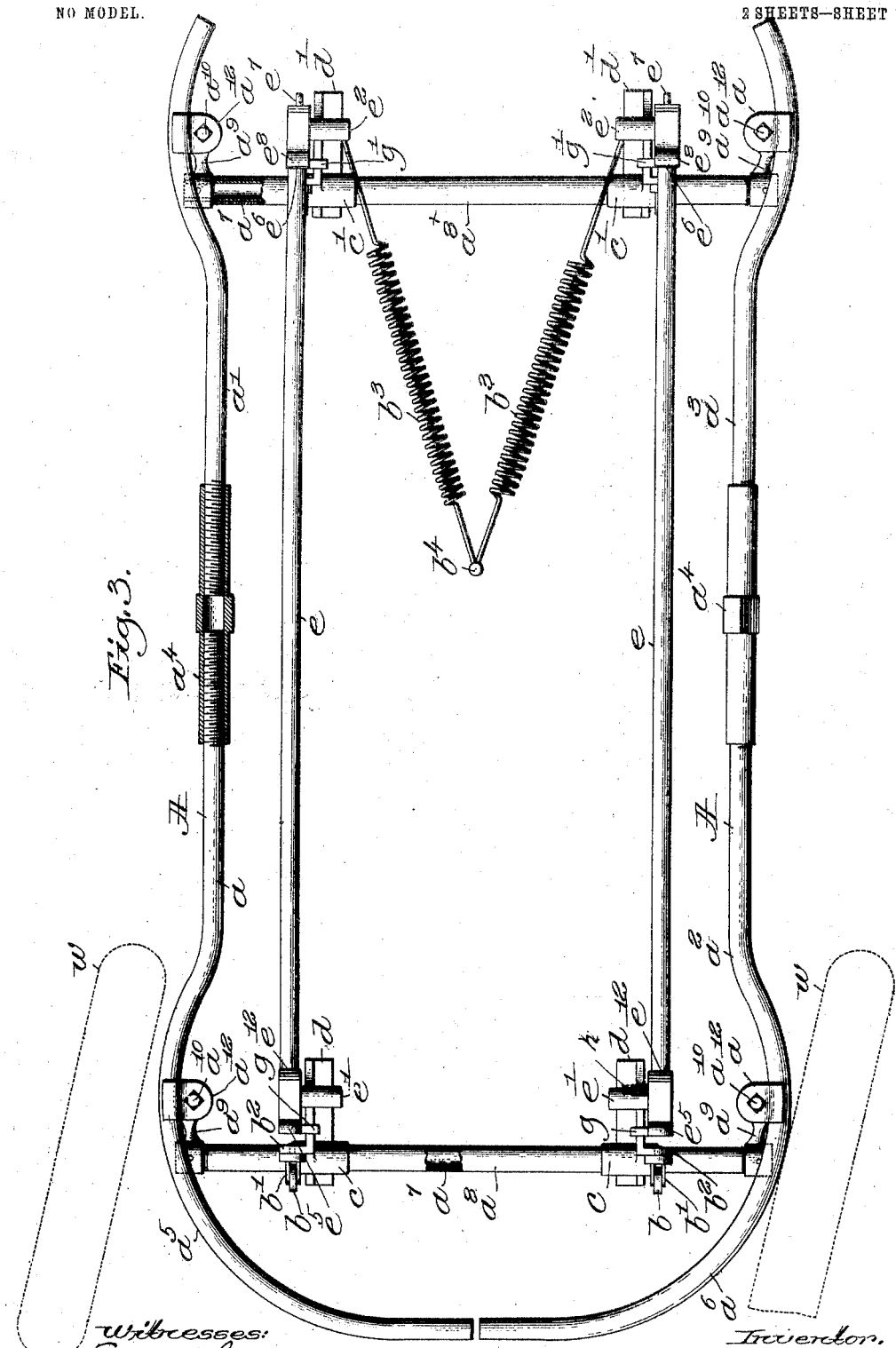

UNITED STATES PATENT OFFICE.

LOUIS A. CASGRAIN, OF WINCHESTER, MASSACHUSETTS.

VEHICLE-JACK.

SPECIFICATION forming part of Letters Patent No. 777,398, dated December 13, 1904.

Application filed March 7, 1904. Serial No. 196,807. (No model.)

*To all whom it may concern:*

Be it known that I, LOUIS A. CASGRAIN, a citizen of the United States, residing at Winchester, in the county of Middlesex and State of Massachusetts, have invented an Improvement in Vehicle-Jacks, of which the following description, in connection with the accompanying drawings, is a specification, like letters on the drawings representing like parts.

This invention has for its object the production of a novel vehicle-jack by which to support free of the floor all the wheels of the vehicle.

My invention has been devised more especially for jacking up vehicles having india-rubber tires, it being very beneficial to remove the weight of the vehicle from the tires when not in use, and this is a matter of very considerable importance with very heavy vehicles— as, for instance, automobiles.

My novel jack is so constructed that the vehicle as it comes into position above the jack will be automatically lifted by the impact of the vehicle against a portion of the jack, the momentum of the vehicle fully operating the jack to lift the wheel of the vehicle from the floor. Preferably the momentum of the carriage will move a portion of the jack over a center, which movement will maintain the jack members in such position as to prevent any back movement of the jack and vehicle due to the weight of the vehicle until the latter is started backwardly manually.

Figure 1, in side elevation, shows my vehicle-jack in one of the best forms now known to me in its inoperative or closed position and just ready to be moved by a vehicle traveling longitudinally of the jack. Fig. 2 shows the jack being somewhat moved by the impact of the vehicle and having lifted the wheels of the latter from the floor, and Fig. 3 is a plan view of my novel jack.

Referring to the drawings, A represents a base composed, preferably, of metal tubing, the same being shaped substantially as represented in Fig. 3, wherein it will be seen that the base is made up of a series of pieces of pipe $a\ a'\ a^2\ a^3$, that constitute the sides of the base, said pieces of pipe being shown as united at the sides of the base by means of a double-ended threaded sleeve $a^4$, engaging the right and left hand threaded ends of the respective rods $a\ a'\ a^2\ a^3$. By turning these sleeves the length of the base may be changed to adapt it to the length of the vehicle to be jacked. The portion of the base that is first traveled over by the oncoming vehicle, which may be an automobile or any other rubber-tired vehicle, is represented as rounded, as at $a^5\ a^6$, such shape serving, if necessity requires, as fenders against which the wheels of the vehicle may strike and move the base laterally on the floor to permit the oncoming vehicle to straddle the base, even though the vehicle fails to come squarely onto the base in straddling the same. The base, of whatever form, is united by like cross-bars $a^7$, (shown in Fig. 3,) preferably also composed of metal tubing, the ends of which are pinned or otherwise secured to like arms $a^9$, connected by suitable bolts $a^{10}$ to ears $a^{12}$, secured to and projecting inwardly from the side tubes of the base.

When the base occupies its inoperative position on a stable or other floor, it will be sustained by antifriction-rolls $b$ of the caster form, the yokes $b'$ sustaining the pivots for the wheels of the casters swiveling on suitable projections $b^2$, connected with the under side of the base. These casters permit of a slight movement of the base on the floor should the wheels of the vehicle in coming onto the jack to be lifted strike the fenders; but these casters become inoperative the moment the jack is operated by the oncoming vehicle.

To prevent the base from being moved unduly forward or out of proper position by an oncoming vehicle, I preferably connect to a part of the jack one or more springs $b^3$, one end of which is attached to a projection $b^4$, although the spring is not absolutely necessary. The spring also acts as a registering means to return the base into proper position after the vehicle has been removed therefrom.

The hollow or tubular cross-bars $a^7$ are surrounded by tubes $a^8\ a^{8\times}$, which have connected with them hubs $c\ c'$ of movable feet $d\ d'$, made in pairs, two located at or near each end of the base. These feet are represented in Figs. 1 and 2 as having their acting ends to contact with the floor at different inclinations or distances from their center of motion, one of the portions of the feet being represented by $d^2$ and the other by $d^3$.

Fig. 1 shows the feet in their normal inoperative position, and it will be seen that the portions $d^3$ lie nearer the floor $d^5$ than the portions $d^4$, and viewing Fig. 2 it will be seen that the portions $d^2$ stand on the floor. To do this, $d^3$ first contacts with the floor, and as the base is moved to the left from position Fig. 1 into the position Fig. 2 the impact of the carriage, as will be described, turns the feet into the full-line position, Fig. 2, which results in lifting the vehicle. The particular shape given to the acting ends of the feet is immaterial so long as the turning of the feet in contact with the floor will cause the base to be lifted.

The rear and front feet $d\,d'$ receive at their upper ends pivots $e'\,e^2$, on which are mounted to swing or turn suitable axle-sustainers $e^3\,e^4$, the lower ends of which have, as shown, tubular portions $e^5\,e^6$, that receive connecting-rods $e$, so that one of said sustainers may be moved from the other. The sustainer $e^4$ is represented as shaped differently from the sustainer $e^3$—i. e., the sustainer $e^4$ has an extended finger $e^7$, which is longer than the finger $e^8$, there being a space $e^9$ left between said fingers. The sustainer $e^3$ has a substantially horizontal surface $e^{10}$ with a slightly-upturned lip $e^{12}$. Each sustainer will preferably have connected therewith a non-metallic surface, as $e^{13}$ $e^{14}$, to prevent marring of the part of the axle.

Assuming that an automobile or other vehicle is to be jacked and that the jack is resting upon the floor, as represented in Fig. 1, the automobile will be moved forward over and to straddle the jack, and should the wheels of the automobile as the latter comes into position to straddle the jack occupy an angular position, as represented by dotted lines, Fig. 3, then the wheels by striking the fender portions of the base will slightly move the same, so that the automobile (or it might be other vehicle) will come squarely onto the base of the jack which is to be moved to lift the vehicle from the floor. Assuming now that the vehicle has been moved forwardly and has straddled the jack and has arrived in the position Fig. 1, where the axle, it may be, of the vehicle meets the longer finger $e^7$ of the axle-sustainers, the impact of the axle against the longer finger immediately moves the sustainer $e^4$ forwardly or to the right, and in so doing through the rod $e$ carries forwardly the sustainer $e^3$. The momentum of the vehicle after striking the fingers $e^7$ is resisted by the springs $b^3$, and as the sustainers are moved forwardly, due to the momentum of the carriage, the pivoted feet are turned in the direction of the arrows near them, Fig. 1, so that the portions $d^3$ thereof immediately contact with the floor, thus removing the casters from the floor, and this movement is continued until the feet occupy the position shown in Fig. 2, wherein it will be seen that a vertical line dropped through the pivotal points $e'\,e^2$ has been carried forward of the heel portion $d^\times$ of each foot, and stops $g\,g'$, carried, respectively, by the sustainers $e^3$ and $e^4$, meet the rear edges of the feet to check any further movement of the base and the feet. In this position it will be noticed that the axle-sustainers are risen from the position Fig. 1 into the position Fig. 2 and have by contact with the axle lifted the wheels $w$ of the vehicle, which are supposed to have india-rubber tires, from contact with the floor, and in this condition the vehicle may be left for any desired time jacked up and the weight of the vehicle removed from the tire. When so jacked, the vehicle may be inspected in any and all parts and its condition ascertained before taking it off from the jack.

To prevent any possibility of the vehicle being thrown off the jack by carelessness, especially when it is desired to remove a wheel, I have provided each of the vehicle-sustainers with an eye, in which I may insert a pin $h$, that will cross one side of the foot and retain the foot in its upright position, so that under no condition could the same turn and let the axle drop.

To discharge the vehicle from the jack, it is only necessary to push the same backwardly or by stepping on the base, which throws the weight of the person back of the centers or axes of the feet, that causes the base and the vehicle both to be moved, for instance, toward the left, Fig. 2, into the position Fig. 1, letting the wheels contact with the floor, when the vehicle may be readily moved off the jack.

I believe that I am the first to construct a jack that may be made to act automatically to lift a vehicle from the floor by or through impact of the vehicle against a portion of the jack, and whereas I prefer that the axle of the vehicle may strike a longer arm of the axle-sustainer coacting with the front axle of the vehicle, yet this invention is not limited to any particular part of the jack that will be struck by the oncoming vehicle, nor is the invention limited to the sustainers contacting only with the axles, as said sustainers might meet any part of the running-gear to lift the wheels from contact with the floor.

The axle-sustainers really constitute vehicle-lifters, the latter being mounted on feet adapted to be turned as the framework of the jack is moved longitudinally, the turning of the feet causing the lifting means to rise and contact with the running-gear to remove the wheels from contact with the floor. It will therefore be understood that my invention is not limited to the exact construction of the so-called "vehicle-lifters" or "axle-sustainers" or to the exact shape shown for the feet or their point of junction with the base; I considering as within the scope of my invention any construction of jack that would include the subject-matter described in this specification and pointed out in the claims at the end thereof. I also believe that I am the first to so sustain a jack of any description upon the floor that an oncoming vehicle will be free to move the jack in one or the other direction to properly centralize the jack with relation to the running-gear, and while I have shown the fenders as being concaved at their exterior it will be understood that they might be differently shaped and beveled and yet perform the functions herein described for them without departing from my invention.

I have described the jack as being moved automatically by the impact of the oncoming carriage; but it will be obvious, should one desire, that the jack may be shoved under a carriage in a stationary position and force enough applied to it to cause it to lift the vehicle, and a lever or otherwise might be used; but this form or manner of using my invention would in a great measure destroy its chief value.

Having described my invention, what I claim, and desire to secure by Letters Patent, is—

1. A vehicle-jack comprising a base, pairs of vehicle-lifting means, and means for sustaining the same, longitudinal movement of the base with relation to the vehicle to be lifted causing the vehicle-lifting means to contact with the vehicle and lift the same.

2. A vehicle-jack comprising a base, pairs of vehicle-lifting means, one of which has an extension, the movement of said lifting means longitudinally with relation to the base causing said lifting means to be moved vertically to lift the vehicle from the floor.

3. A vehicle-jack comprising pairs of vehicle-lifting means movable by contact of the vehicle therewith, the lifting means contacting with and lifting the vehicle to remove its wheels from the floor.

4. A vehicle-jack comprising a frame having a series of feet pivoted thereto, pairs of vehicle-lifting means carried by said feet and movable by the coming of the vehicle over the jack to cause said feet to be turned and the lifting means to be raised to contact with the vehicle and lift the weight of the vehicle and its tires from the floor.

5. A vehicle-jack comprising a base having a series of feet normally occupying an inoperative position with relation to the base, and a plurality of vehicle-lifting means carried by said feet, the oncoming of a vehicle to straddle said base causing the lifting means to be moved on or with relation to the feet, thus turning the feet to rock over the floor and lift the vehicle.

6. A vehicle-jack comprising a base, two pairs of axle-sustainers occupying normally a position distant from the floor lower than the under side of the axles of said vehicle, means to connect said pairs of axle-sustainers, one of said pairs having an extension against which the axle of the vehicle will contact as the latter comes into lifting position above the base, the pair of said axle-sustainers to be struck by the vehicle moving the complemental pair and lifting the vehicle with relation to the base.

7. A vehicle-jack comprising a base, two pairs of axle-sustainers occupying normally a position distant from the floor lower than the under side of the axles of said vehicle, movable means connected with said base and supporting said axle-sustainers, means to connect said pairs of axle-sustainers, one of said pairs having an extension against which the axle of the vehicle will contact as the latter comes into lifting position above the base, the pair of said axle-sustainers to be struck by the vehicle moving the complemental pair and lifting the vehicle with relation to the base.

8. A vehicle-jack comprising a base shaped to constitute a fender that may be moved by contact of the wheels of an oncoming vehicle to centralize the base with relation to the vehicle to be lifted.

9. A vehicle-jack comprising a base shaped to constitute a fender, and vehicle-lifting means thereon occupying normally an inoperative position and actuated by the oncoming vehicle and rendered operative to lift the vehicle from the floor.

10. A vehicle-jack comprising a base having a portion thereof shaped to constitute a fender, and casters sustaining said base.

11. A vehicle-jack comprising a base having a portion thereof shaped to constitute a fender, and casters sustaining said base, feet connected with said base, vehicle-lifting means sustained by said feet, the turning of the feet to cause the vehicle-lifting means to contact with and lift the vehicle removing the casters from the floor.

12. A vehicle-jack comprising a base shaped to constitute a fender, the sides of the base having means whereby the length of the base can be altered to the length of the vehicle to be jacked.

13. A vehicle-jack comprising a base, and springs to connect said base with the floor.

14. A vehicle-jack comprising a base connected by rods, and sleeves applied to said rods, said sleeves having connected with them feet, a plurality of vehicle-lifting means mounted on said feet, and means for connecting said vehicle-lifting means at one end of the base with the vehicle-lifting means at the other end of the base, the longitudinal movement of the vehicle-lifting means causing the feet to be turned on the base and the base to be lifted together with the vehicle-lifting means.

15. A vehicle-jack comprising hollow tubing bent to present at one end a buffer against which wheels may contact.

16. A vehicle-jack comprising hollow tubing bent to present at one end a fender against which wheels may contact, the side portions of the base being longitudinally adjustable.

17. A vehicle-jack comprising a base, movable feet sustained thereby, vehicle-lifting means mounted on said feet and having stops to contact with said feet when the latter and the vehicle-lifting means occupy their operative position.

18. A vehicle-jack comprising a base, movable feet sustained thereby, vehicle-lifting means mounted on said feet and having stops to contact with said feet when the latter and the vehicle-lifting means occupy their operative position, and means for locking the vehicle-lifting means and feet stationary when in their operative position.

19. A vehicle-jack adapted to be located by the vehicle, and containing vehicle-lifting means to lift the vehicle.

In testimony whereof I have signed my name to this specification in the presence of two subscribing witnesses.

LOUIS A. CASGRAIN.

Witnesses:
GEO. W. GREGORY,
EDITH M. STODDARD.